Nov. 10, 1942.    W. WIEBECKE    2,301,489
MECHANISM FOR THE RECOVERY IN SERIES OF MINE
PROPS BY TRACTION MEANS
Filed May 23, 1939    5 Sheets-Sheet 1
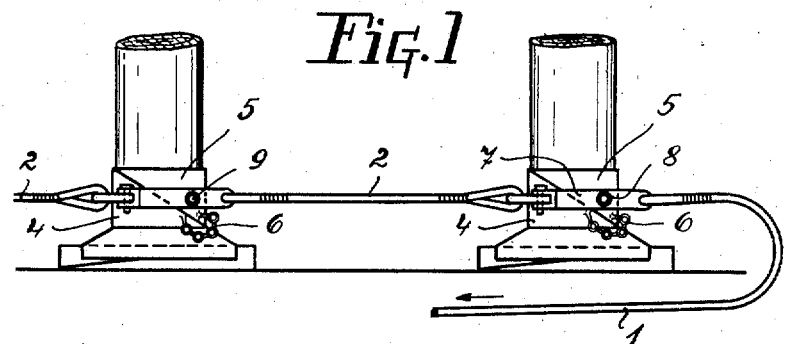
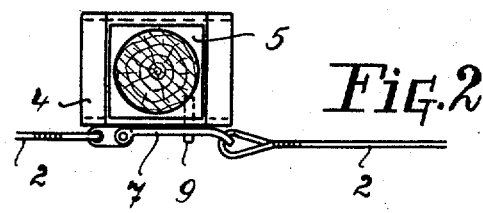
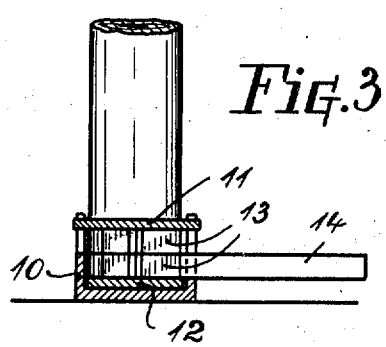
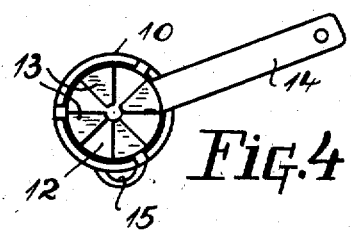
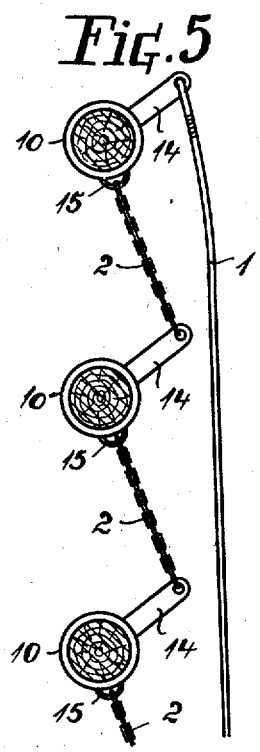
Inventor:
Walter Wiebecke Nov. 10, 1942. W. WIEBECKE 2,301,489
MECHANISM FOR THE RECOVERY IN SERIES OF MINE
PROPS BY TRACTION MEANS
Filed May 23, 1939 5 Sheets-Sheet 3

Inventor:
Walter Wiebecke
by Arthur M Hahn
ATTY.

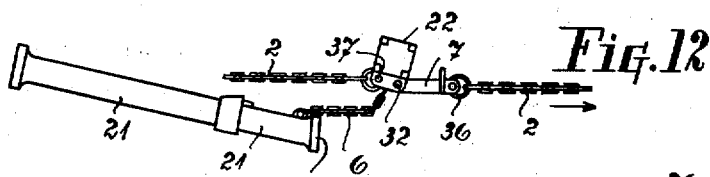
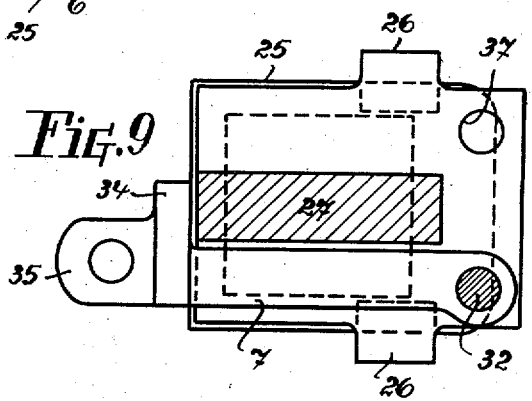
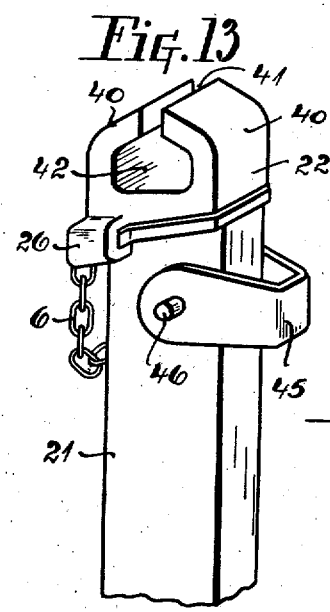
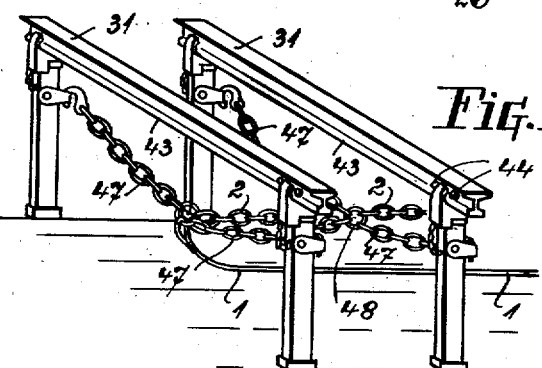
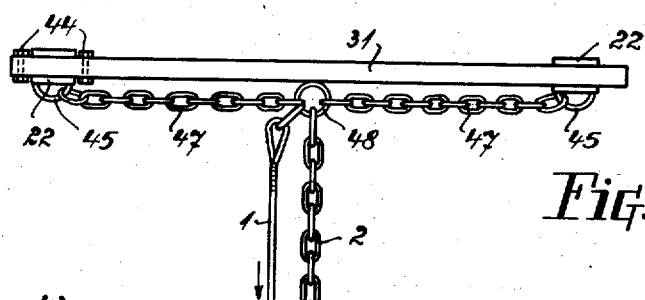
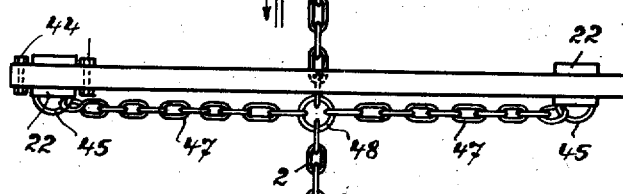

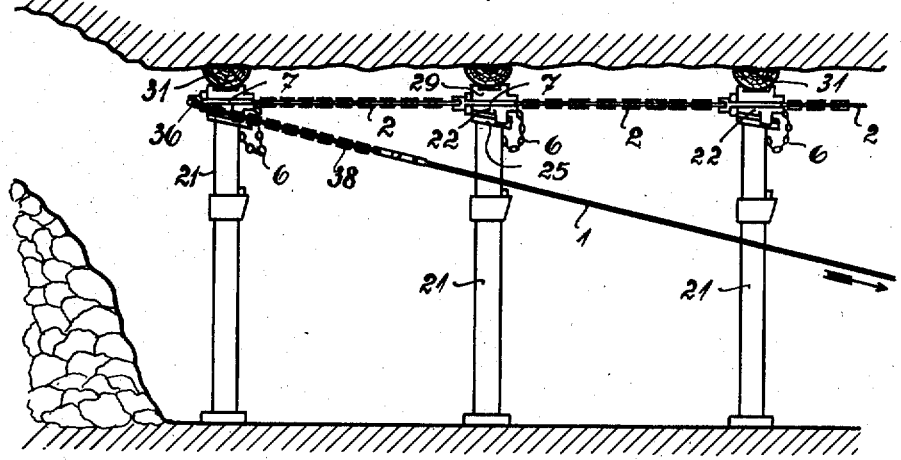
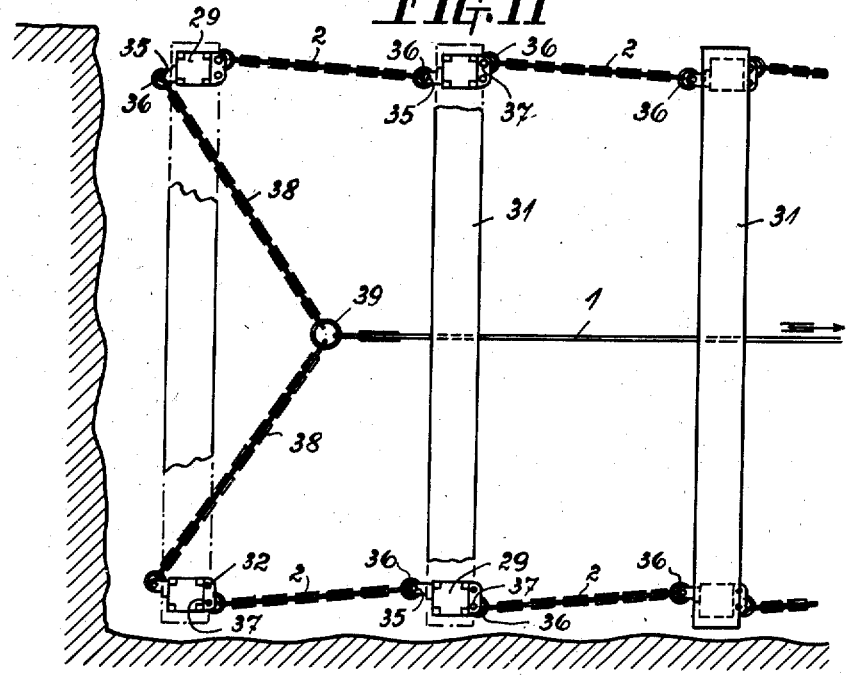

Patented Nov. 10, 1942

2,301,489

UNITED STATES PATENT OFFICE 2,301,489

MECHANISM FOR THE RECOVERY IN SERIES OF MINE PROPS BY TRACTION MEANS

Walter Wiebecke, Alsdorf District Aachen, Germany; vested in the Alien Property Custodian Application May 23, 1939, Serial No. 275,286 In Germany June 2, 1938

18 Claims. (Cl. 262—1)

The invention refers to a device which makes possible the release and salvage of mine props arranged in rows and provided with auxiliary means for relieving them of the pressure of the ground or roof. The props are to be thrown over or dislodged one after the other starting from the choke and recovered in the greatest possible number, as is customary in mines, after they have been previously relieved of their compression forces. In employing for this purpose the auxiliary means and procedure customary so far in mines, the bringing into effect or actuation of the prop tension relieving means and in particular the salvage of the props or stays, required the presence of the miners in the immediate vicinity of such a zone, with the consequent and inevitable certain risk involved in their work.

It is true that it has been suggested to so design the tension relieving means of each individual prop in such a way that this means could be actuated with the aid of a cable from a distance, thereby no longer involving any danger for the workers, and furthermore, to unite the prop supports themselves with another cable or the same one in such a way that the prop or stanchion, after relieving the forces therein, could be released and dragged from the danger zone after having been upset by further pulling of the cable. However, these well known auxiliary means still make necessary certain activities, or manual labor in close proximity to a possible caging-in subsequent to the release and salvage of each individual prop or stanchion, especially for the purpose of attaching the hauling cable with the relief mechanism of any specific prop and the body of such a prop or stanchion to be recovered. Apart from the inevitable dangers connected with working in this zone, the frequently repeated waiting for the falling-in and taking shelter, and the actuation of the windlass in each particular instance, cause considerable loss of time and require a comparatively large crew of workmen.

To do away with these drawbacks, in accordance with the present invention, the series of props, to be recovered successively, are interconnected by traction members and attached to a hauling cable leading up to the (head) end of the row of props in the gallery of the mine. A pull on the hauling cable by the winch is transmitted to the intermediate traction members one after the other, so that, beginning at the far end of the row of props, each prop is loosened and jerked or pulled out of its supporting position and all props are finally pulled out of the mine gallery.

A further object of the invention is to provide auxiliary means for relieving the individual props of the ground or roof pressure, previous to throwing them over. Such auxiliary means are connected with the traction members interposed between successive pairs of props, so that the preceding end (of the train) is directly linked with a prop, and the subsequent end indirectly connected by a lever swinging about the next following prop of the series and provided for the purpose of releasing the disengaging mechanism of that prop. By this method of linking the props it becomes possible, by uninterruptedly pulling the hauling cable with the aid of the winch, to relieve the tension on any prop at the head of the series and all subsequent props of the same and drag them away from the zone of a possible caving-in without the necessity of any manual labor in the proximity of said zone, and without loss of time.

Further details of the invention are directed to the various forms of the prop sills or locks of the props.

The accompanying drawings illustrate a number of modified examples embodying the features of the present invention.

Figure 1 is an elevation showing two props interconnected and ready to be pulled down;

Figure 2 is a plan view of one of the props of Figure 1;

Figure 3 is an elevation partly in section of a modified construction of the tension relieving means of a prop;

Figure 4 is a plan view of the lower part of the tension relieving means of Figure 3;

Figure 5 is a plan view showing three props, of the type of Figures 3 and 4, interconnected and ready to be pulled down;

Figure 9 is a horizontal top section through the release head of the prop of Figure 8;

Figure 10 is a longitudinal section through a mine gallery prepared for the salvage of a series of props of the type of Figures 8 and 9;

Figure 11 is a part sectional and part plan view of the mine gallery and series of props of Figure 10;

Figure 12 is a plan view showing a prop of the type of Figure 8 knocked down and being hauled out during salvage;

Figure 13 is a perspective view of a modified form of mine prop;

Figure 14 is a perspective view showing the necessary connections of the dismantling parts for the type of prop of Figure 13; and Figure 15 is a plan view of Figure 14.

The traction means 1, represented as a wire rope or cable by way of example, and the rear end of which is attached to a winch (not shown), is fixed with its forward end to the shoe 4, 5 of the first of a series of props to be salvaged, as illustrated in Figures 1 to 6. Each subsequent prop shoe is connected with the preceding prop shoe by an intermediate traction member 2, in such a way, that the intermediate members 2 with the prop shoes form an extension of the traction means 1 in rearward direction. Thus, the prop shoes represent traction transmitting members of the inverting hauling train and are dragged out from the timber framework without any special auxiliary means. These prop shoes may be connected, either rigidly or by means of short chains or other suitable strong intermediate traction members, with the other parts of the props to be recovered, in such a way, that the props themselves will also be dragged out by the hauling train.

Figure 7:
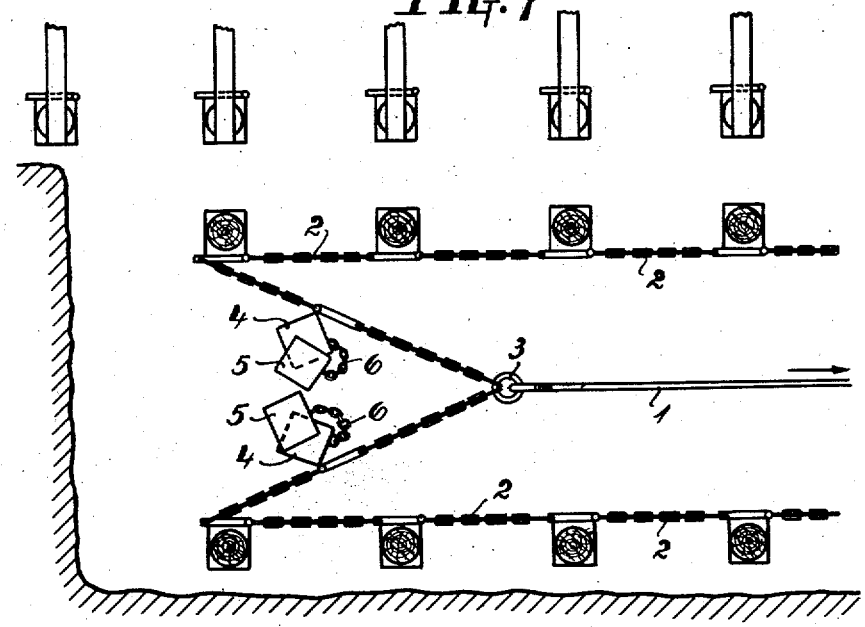
Figure 7 is a part sectional and part plan view of a mine gallery.

According to the modification shown in Figure 7, the forward end of the rear hauling cable attached to the winch is bifurcated at 3 and simultaneously fixed to the shoes of the first prop to be recovered of two spaced series of props running parallel to one another. By this method, two rows of props may be felled and the prop parts salvaged simultaneously by a single hauling cable 1 attached to the winch.

With the design according to Figures 1–6, the tension relief means are disposed at the base of the props. The prop shoes are preferably formed of two parts slidable relative to one another but not altogether separable one from the other, since in this way the prop may be relieved of the ground or roof pressure without the necessity of exerting any unduly large tractive force.

In accordance with Figures 1 and 2, the prop shoe is composed of two parts 4 and 5 supporting one another by slanting or lateral surfaces, said parts being connected with one another by a short chain 6. On the side of part 4 facing the hauling cable, a lever or flap lock 7 is hinged on a vertical pivot at the rear side of said shoe part 4, said lever engaging a projection 9 on part 5 by means of the perforation 8 in the lever to lock and prevent a sliding asunder of said parts 4 and 5. The hauling cable 1 is attached at the first shoe of the series of props to the free end of the lock 7; likewise, the rear ends of the intermediate members 2 are connected with the free ends of flap lock 7, and their forward ends with the body of the shoes themselves. Thus, during the salvage the lock 7 of each prop is first pulled off or out of the projection 9 by the rearward movement of the hauling cable, whereby the shoe parts 4 and 5 will slide apart or is pulled asunder. The prop is thus relieved and loosened and will be pulled down and dragged away when further pull is exerted on the train hauling rope. In this manner, the prop shoes are removed from the structure one after the other when continued traction is exerted on the train hauling rope 1, and thus dragged away together with their respective props.

With the modified form according to Figures 3 to 5, the prop shoe consists of a cup-shaped support 10 and two discs 11 and 12 concentrically arranged one above the other. Both the discs 11 and 12 are provided on the sides facing one another with sector-like projections 13 uniformly distributed and serving to support one another. Disc 11 is fixed against rotation on the support. The other disc 12 in the support 10 is provided with a lever 14 to which is attached the traction means 1, or one end of the intermediate traction member 2, the other end being fixed to the body of the preceding prop or the shoe part thereof, by means of the lug 15. During the work of salvage, lever 14 of the prop is swung around a vertical axis of the prop by the traction of the hauling cable. The disc 12 is thereby turned relative to disc 11 so that the sector-shaped projections 13 of disc 11 will enter between the spaces of the projections 13 of disc 12 so that the prop and its disc 11 and its projections 13 will fall slightly to thereby release the prop.

Figure 6:
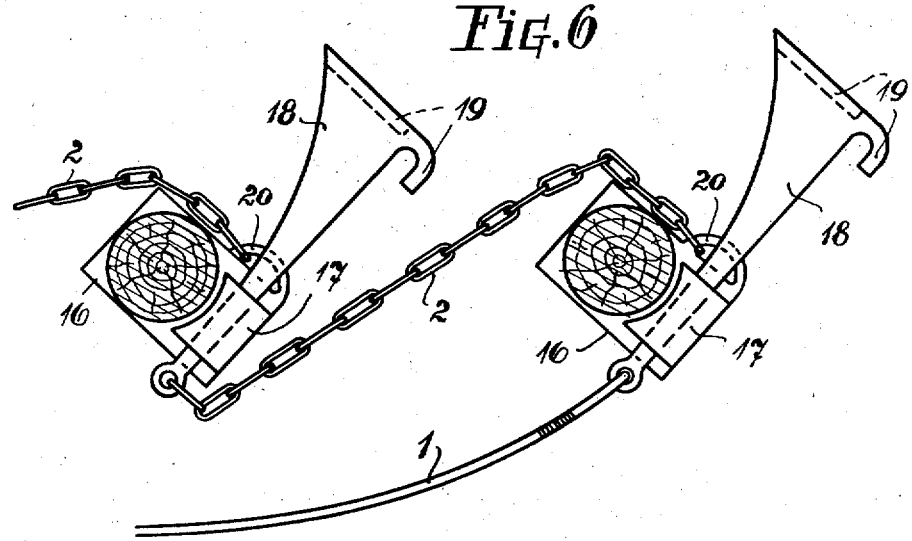
Figure 6 is a plan view showing two props with a modified tension relieving means interconnected and ready to be pulled down.

Figure 6 shows a further modified example of execution of a prop shoe. The prop shoe includes a plate 16 provided on one side with a lug 17 forming a guiding groove open towards the prop and in which a wedge member 18 is adapted to slide. The hauling cable 1 and the intermediate members 2 with their rear ends (looking in the direction of traction) are attached to the small ends of the wedges 18 in such a way, that the wedges will successively force the props off their respective plates 16 when the hauling cable 1 is pulled, thereby releasing the props. Each wedge 18 is provided with a carrier hook 19 at its largest end, serving to grip the plate 16 by means of the lug 17 and carry it along after the prop has been forced therefrom by the wedge. The forward end of the intermediate members 2 is attached to lug 20 of plate 16. If in place of the props supported in shoes, according to Figures 1 to 7, others are used which for the purpose of relieving pressure consist of two parts slidable against one another and which may be locked, then, in accordance with the invention, the locking means, wedges, or racks provided in such a lock, in connection with the props of one and the same row, are connected to each other in series and with the traction means in such a way, that the release of pressure and the dragging-out of the prop parts, including the locks, from the structure is effected in the same manner as in the case where prop shoes are employed. As a matter of course, the locking means, wedges or racks are provided with stops or hooks 19 to prevent their being freed from their locking means after the pressure has been relieved, so that they can pull their respective props along.

Figure 8:
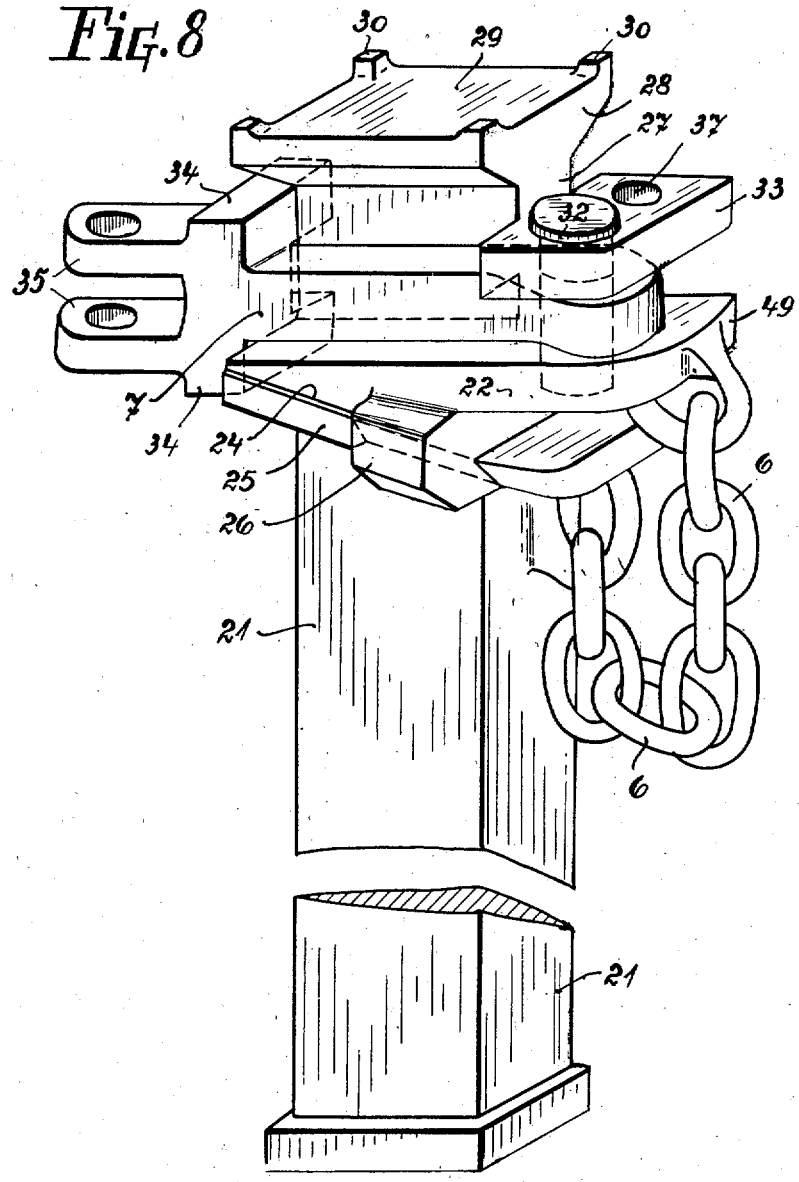
Figure 8 is an isometric projection of a mine stay in accordance with the invention, with the tension relief device attached to the upper end thereof.

With the device constructed in accordance with Figures 8 to 12, the prop consists of the post 21 and the head member 22 adjustably attached to the upper end thereof. For the purpose of ready adjustment to the thickness of a lode or vein, the prop shaft may be composed, in known fashion, of two interlocked parts adjustable lengthwise. At the upper end of the post 21 a flat plate 25, Figures 8 and 9, is provided obliquely positioned at a suitable angle to the axis of the prop, the correspondingly shaped oblique flange or surface 24 of the upper head part 22 resting upon said plate.

The upper head part 22 is provided at each of its opposite long sides with a guide grip 26.

These grips take hold of downwardly slanting edge faces of the plate 25 so that apart from the movability of the prop head in the longitudinal direction of its slanting face, a joint is effected between the prop head and the prop itself which may be disengaged by such a movement. Above the tapered surface 25, of the plate 25 the body of the prop head is provided with recesses on both sides in parallel relation to its longitudinal plane, between which the center part, in the shape of a web 27, unites an extension 28 disposed on both sides above said recesses. On the edge of the upper supporting face 29 of said extension, for instance, four upward projections 20 may be provided serving to prevent any lateral movement in longitudinal direction of the prop head in relation to the roof beam 31 directly supported by said head, said beam 31 in the present example being made of wood, Figures 10 and 11.

The angle of inclination of the tapered plate 24 in the example has been assumed to be greater than the angle of repose, and thus any shifting of the prop head of this plate on flange 25 of the prop by ground pressure is prevented by a hinged lock 7 whose pivot 32 is supported in a hole through two horizontal ledges 33 and 49 provided on the higher side (i. e. the side facing the direction of salvage) of the prop head 22. The end of the hinged lock 7 projecting toward the direction of release grips with a lower holding catch 34 over the corresponding top rim of the tapered flange 25, in such a way, that the shifting of the prop head along the direction of the catch of the tapered flange 25 is prevented. The hinged lock 7 has a grip 34 on its lower side as well as on its upper side. By reason of the gripping of the holding claws 26 on the oblique border faces of the tapered flange 25, a rigid union is effected between the prop shaft and the prop head which may be uncoupled only when the lock 7 is swung out.

At the free end of the hinged lock 7, a double lug 35 is provided which, with the aid of a ring or link 36 and, for example, a bolt, serves to interconnect the prop heads by means of the traction members 2, Figures 10 and 11, each member 2 being preferably in the form of a chain. The forward end of each one of these intermediate members 2 is also connected with the second pin hole 37 by means of a ring 36 and a pin, said hole 37 being located in the transverse ledges 33 and 49 of the preceding prop head 22. This hole 37 is arranged symmetrically in regard to the other bore in said transverse ledges in which the pivot 32 of the lock 7 is disposed. In this way, it will always be possible to arrange the hinged lock 7 on the one side or the other of the web 27 of the head so that the lock 7 may be swung out internally or away from the wall of the tunnel or gallery, and subsequently in the direction of hauling or salvage. It is, therefore, possible to employ identically designed prop heads on the righthand or lefthand side of the tunnel, as may be required.

In rigging up the hauling train according to the invention, the hauling cable 1 is connected directly or by an auxiliary chain with the double lug of lock 7 of the prop located closest to the choke. For the purpose of applying the hauling method to two spaced rows of props, the hinge locks 7 swing inwards toward one another in the space between the two rows of props, and are connected with the end of the hauling cable 1 for instance by means of a ring 39. By pulling the hauling cable, that is winding it on a winch, the locks 7 of both props which support the two ends of one and the same beam 31, are swung out simultaneously, as will be readily understood. By this, or at least by continuing the pulling operation, the prop heads are disengaged and the props are relieved of ground and roof pressure.

The force of traction transmitted by the hauling cable over the two connecting chains 38 to the lock 7 is transferred by the pivot pins 32 to the body of the prop head 22, so that the latter is dragged out from under the beam supported by the two props. The prop head and the prop 21 will then drop to the ground in the direction of hauling, the prop shaft 21 being as a matter of fact, pulled down the intermediate or connecting chain 6. In continuing this procedure, the force of traction of the hauling train is again transmitted to the forward ends of the two hinged locks 7 of the two subsequent pair of props to continue the release and salvage that pair of props and those following. The parts to be salvaged will, as the hauling train continues on its way, occupy the position illustrated in Figure 12, and in this manner the props and their parts will be carried off by the hauling train out of reach of possible collapse of the roof of the mine tunnel.

Figures 13 to 15 illustrate a modification of the invention wherein the cross beams are simultaneously salvaged with the prop parts supporting them, so that such cross beams may be used again. For this purpose, iron or steel rails, such as worn railroad or mine rails may be used in place of the wooden beams. For the purpose of effecting a reliable supporting union of the prop heads with such roof supporting rails 31', the prop head attached to the upper end of the prop shaft is designed, in well known fashion, in such a way that the projections provided on the edges of the upper supporting face are in the form of ledges or jaws 40 arranged transversely to the hauling direction of the salvage operation. The jaws 40 are bent inwards toward one another with a web slot 41 therebetween, and a transverse recess 42 below the slot 41 whereby the jaws will grip the rail 31' at the head part 43 and the adjacent web.

The angle of the plate 25 relative to the prop 21, Figure 9, declines along the center plane and extends in an opposite direction relative to the hauling or salvage direction, the angle of inclination being smaller than the angle of repose. In this case, a special locking mechanism, to be made inoperative by the force of traction of the hauling train, may be dispensed with and, therefore, has not been provided with this particular construction. The release of the prop from ground and roof pressures, in this instance is brought about in such a way that the prop is brought down by pulling on the connecting link 45 provided for that purpose near the upper end of the prop, while the tapered or angular supporting faces slide in a slanting direction between the prop head 22' and the plate 25, the prop being then pulled or dragged away. During this releasing operation, the prop head 22' maintains its hold on the head part 43 of the rail 31' by the frictional resistance of the girder rail. The connecting link 45 is preferably connected to the prop shaft by a transverse pivot 46 so that it may rotate thereon.

After completion of the releasing movement, the prop head 22' and the steel rail 31 gripped by the jaws 40 remain in connected relationship. As the pulling continues, the prop head 22' and the rail 31' will fall to the ground with the prop shaft 21, the latter being connected with the head 22' by means of the chain 6. The immediate freeing of the rails from the roof pressure and their salvage are facilitated by a suitable design of the traction connecting members, the traction of the hauling cable being transferred simultaneously to the two ends of the props supporting the rail. For the purpose of linking the rails to the hauling train, it is desirable that one of the two ends of the rail be connected with the prop head part supporting its head in such a way that the head 22' cannot be shifted longitudinally on the rail. This may be carried out for instance by means of bolts 44 which are applied to the web of the rail on both ends of the supporting jaws 40, the protruding bolt heads and nuts preventing any longitudinal shifting, while, at the other end of the rail, longitudinal shifting of the joint between the rail head and the prop head may take place.

For the purpose of connecting the parts with the hauling train, the two props supporting each rail, are connected by their connecting links 45 with the outer ends of two chains 47 which have their inner ends connected to a centrally disposed intermediate ring 48. The intermediate rings 48 of the spaced pairs of props of the series are linked by the intermediate members 2 of the hauling train chain to one another and with the hauling cable 1. During release and salvage, the traction force applied to the central ring 48 is uniformly transmitted to the connecting links 45, by the chains 47, so that each pair of props and its rails are successively collapsed and released. By this traction force the friction between the slanting or oblique faces of the prop 21 and its 22' is almost immediately overcome. The top rail will fall down in the hauling or salvage direction the moment the props themselves fall, and the rail will be dragged along in the direction of salvage by that end of the rail in which the head bolts 44 are provided.

I claim as my invention:

1. A device of the character described comprising mine props each in two parts movable with respect to each other, means for interconnecting the two parts of the prop, means for causing movement of one part relative to the other to collapse the prop and to salvage the two disconnected parts by the interconnecting means, and means for connecting the props in series.

2. A device for pulling down and salvaging a row of mine props in which each prop is in two parts movable with respect to each other, comprising means for connecting the props in series, and means for successively causing relative movement between the two parts of each prop to collapse and salvage the props.

3. A device for pulling down and salvaging a row of mine props in which each prop is in two parts movable with respect to each other, comprising means for connecting the props in series, means for connecting the two parts of each prop together, and means for successively causing relative movement between the two parts of each prop to successively collapse the series of props beginning at one end of the row and salvage the prop parts by the series connection.

4. A device for pulling down and salvaging a row of mine props in which each prop is in two parts movable with respect to each other, comprising flexible means for connecting one part of a prop with the same part of an adjacent prop so that said parts will be connected in series, flexible means for interconnecting the two parts of each prop, and means for successively causing relative movement between the two parts of each prop to successively collapse the series of props beginning at one end of the row and salvage the prop parts by the series connection.

5. A device for pulling down a row of mine props, comprising a member for each prop on which the prop is adapted to rest, a wedge member for each prop and cooperating with the first-named member, means for connecting each first-named member to the wedge member of the next following prop of the row of props, and means at a point remote from the row of props for applying a pull on the wedge member of one end of the row of props to successively actuate the wedge members to successively cause relative movement between the prop and its rest member to successively pull down the row of props by the connecting means.

6. A device for pulling down a row of mine props, comprising a prop shoe for each prop in the form of a plate having a lug with a guiding groove therein, a wedge member for each prop movable in the guiding groove, a flexible connection between each plate and the wedge member of the next following prop of the row of props, and means at a point remote from the row of props for applying a pull on the wedge member of one end of the row of props to successively move the wedge members in their guiding grooves to successively cause relative movement between the props and their plates and to successively pull down the row of props by the flexible connections.

7. An apparatus for pulling down a row of mine props and for salvaging the props in which each prop is in two parts movable with respect to each other, comprising means for interconnecting the props of the row in series, and traction means connected to one end of the series of props which when pulled near the other end of the series of props the latter are successively pulled down by moving one of the parts of each prop and are salvaged as the entire row of props are successively pulled down, the pulling down and salvage of the props beginning with the prop at the end where the traction means is secured and the successive props being pulled down and salvaged with the aid of the interconnecting means.

8. An apparatus for pulling down a row of mine props and for salvaging the props, comprising means provided for each prop and forming a part thereof so that the two parts may be moved relative to each other, means interconnecting the row of props in series, and a cable connected to the prop at one end of the series which when pulled near the other end of the row of props the latter are successively pulled down by successively moving one of the parts of each prop and are salvaged as the entire row of props are successively pulled down, the pulling down and salvage of the props beginning with the prop at the end where the cable is secured and the successive props being pulled down and salvaged with the aid of the interconnecting means.

9. An apparatus according to claim 8, in which the first-mentioned means is a releasing member for each prop and includes means for releasing said member from the prop.

10. An apparatus according to claim 8, in which the first-mentioned means is a releasing member for each prop and includes means for releasing said member from the prop, and in which the interconnecting means is in the form of a plurality of short lengths of chain each connected to adjacent props.

11. An apparatus for pulling down a row of mine props and for salvaging the props, comprising a prop shoe on which each prop is secured and rests and having a movable part and a part connected to the prop with lateral contacting surfaces, means for interconnecting the two parts of each prop, a lock for holding the two lateral surfaces of the parts in contact with each other in the supporting position of the prop, and means for connecting the movable part of one prop with the lock of the adjacent prop, and traction means connected to the lock of the last prop of the row and upon exerting a pull on the traction means at a point near the end of the row opposite the end to which the traction means is connected to the last prop said traction means successively unlocking the locking means, separating the movable part from the cooperating part of each prop, pulling down the props and salvaging the row of props toward the point where the pull is exerted on the traction means.

12. An apparatus according to claim 11, in which each lock is composed of a flap hinged on the movable part and a projection on the other part which cooperates with the flap.

13. An apparatus for pulling down a row of mine props and for salvaging the props, comprising a shoe for each prop consisting of a cup shaped support, a disc mounted in the support having a plurality of circumferentially spaced projections, a disc secured on the end of each prop and having a plurality of circumferentially spaced projections cooperating with the projections on the first-mentioned disc, a lever secured to each of the first-mentioned discs, means for connecting the lever of one prop with the support of the adjacent prop to thereby interconnect the row of props in series, and traction means connected to the lever of the last prop of the row and upon exerting a pull on the traction means at a point near the end of the row opposite the end to which the traction means is connected to the last prop said traction means successively rotating the first-mentioned disc by its lever, collapsing the projections of the second-mentioned disc in the spaces of the first-mentioned disc of each prop, pulling down the props and salvaging the row of props toward the point where the pull is exerted on the traction means.

14. A device for pulling down a row of mine props, comprising a member for each prop on which the prop is adapted to rest, a wedge member for each prop and cooperating with the first-named member and having a carrier hook at one end, means for connecting each first-named member to the wedge member of the next following prop of the row of props, and means at a point remote from the row of props for applying a pull on the wedge member of one end of the row of props at the other end of the wedge member to successively actuate the wedge members to successively cause relative movement between the prop and its rest member to successively pull down the row of props by the connecting means and the carrier hooks.

15. A device according to claim 14, in which the first-named member is provided with a lug which is adapted to engage the hook of the wedge member when the props are pulled down.

16. An apparatus for pulling down a row of mine props and for salvaging the props, comprising a prop shoe for each prop in the form of a plate, a wedge member for each plate, said plate having means to guide the wedge member and each wedge member being elongated, a flexible connection between each plate and the wedge member of the next following prop of the row of props, said wedge members being arranged substantially parallel to each other, and means at a point remote from the row of props for applying a pull on the wedge member of one end of the row of props to successively move the wedge members in their guide means to successively cause relative movement between the props and their plates and to successively pull down the row of props by the flexible connections.

17. An apparatus according to claim 16, in which each wedge member is provided with a connecting means for the guide means of the plate adapted to engage the guide means when the props are pulled down and salvaged.

18. An apparatus according to claim 16, in which the pull means includes a traction means on which a force is applied in a direction substantially parallel to the direction of the elongated wedge members.

WALTER WIEBECKE.